United States Patent [19]
Farrow et al.

[11] Patent Number: 5,762,671
[45] Date of Patent: Jun. 9, 1998

[54] MULTI-SIZE THREADED ADAPTER

[76] Inventors: James V. Farrow, 1804 Devonshire Rd., Decatur, Ala. 35601; Jerry Don Saint, 1560 Pineywood Rd., Leighton, Ala. 35646

[21] Appl. No.: 799,141

[22] Filed: Feb. 13, 1997

[51] Int. Cl.$^6$ .............................. B01D 46/00; B01D 27/00
[52] U.S. Cl. .......................... 55/496; 55/502; 55/498; 210/444; 210/232; 210/249; 210/DIG. 17; 285/177
[58] Field of Search .................... 55/503, 502, 498, 55/496; 210/443, 444, 232, DIG. 17, 249; 285/177

[56] References Cited

U.S. PATENT DOCUMENTS

| | | | |
|---|---|---|---|
| 3,866,950 | 2/1975 | Skoch et al. | 285/177 |
| 4,052,307 | 10/1977 | Humbert, Jr. | 210/DIG. 17 |
| 4,859,328 | 8/1989 | Groezinger et al. | 210/DIG. 17 |
| 4,971,366 | 11/1990 | Towsley | 285/177 |
| 5,267,983 | 12/1993 | Oilschager | 285/177 |
| 5,569,222 | 10/1996 | Haselhorst et al. | 285/177 |

*Primary Examiner*—Jay H. Woo
*Assistant Examiner*—Robert Hopkins
*Attorney, Agent, or Firm*—John C. Garvin, Jr.

[57] ABSTRACT

An adapter which enables a person to use different, selected, sizes of inexpensive, readily available, oil or air filters to act as air filters to provide greater air filtration for hydraulic systems. The adapter includes a body having an axial central opening therethrough; an enlarged, cylindrical, central section having first and second opposed surfaces; a first end section extending from the first surface of the central section and having an enlarged, externally, threaded portion; a smaller, externally, threaded portion extending from the enlarged externally threaded portion; a reduced cylindrical section attached to the second surface of the enlarged, cylindrical, section of the body; and a male bayonet locking member fixed to the free end of the reduced cylindrical section of the body for engagement with a female receptacle member attached to a fluid reservoir. The enlarged, externally, threaded portion and the smaller, externally, threaded portion being adapted to be selectively engaged with different sized internally threaded openings in conventional, standard, oil filters.

17 Claims, 3 Drawing Sheets

MULTI-SIZE THREADED ADAPTER

FIELD OF THE INVENTION

The present invention relates to an adapter for use with hydraulic systems, and more particularly to an adapter that can be associated with a fluid reservoir of hydraulic systems and selected conventional, standard, filters of different sizes which permit air flow through a filter media within the conventional filter between the atmosphere and the cavity within the reservoir which houses hydraulic fluid.

BACKGROUND OF THE INVENTION

Most hydraulic systems are equipped with a filtering device to allow the reservoir for the hydraulic system to be filled with fluid and to let filtered air flow into and out of the reservoir as the fluid level changes due to the fluid being pumped out into the hydraulic system and returned to the reservoir.

For many years, this has been principally accomplished by means of a relatively small filler-breather assembly. This assembly normally consists of a tank mounted receptacle with screen, and a small cap with porous filter material inside. The small cap usually attaches to the reservoir of hydraulic systems by means of locking lugs or more commonly called bayonet type latch mechanisms. The air flows through the small cap and filter material to allow the reservoir to "breathe". These caps are normally very small and provide little contaminant-holding capacity.

In recent years, industry has become more aware of the damage caused by air-borne contaminants entering the reservoir through the relatively small filler breather assembly, and in many applications would like to install a filler-breather assembly with greater filtration capacity. Therefore, a means of attaching a larger, inexpensive, standard, filter to the reservoir is desirable.

This has been accomplished by providing threaded couplings in the reservoir to accommodate a specific thread of a conventional filter or by providing an adapter designed to mate with the bayonet receiving receptacle on the reservoir and with the specific thread offered by the particular filter manufacturer. This situation solves the problem of providing greater air filtration for the reservoir, however, since a standard filter has a one sized opening, it restricts the user to the specific filter for which the bayonet-to-threaded type adapter is designed.

In order to alleviate this problem, the present invention provides an adapter that will mate with the existing bayonet receiving receptacle that is present on almost all reservoirs and can be used with the inexpensive, readily available, filters having threaded openings of different sizes. The adapter of the present invention provides multiple stepped-threaded connections that will fit threaded openings in standard filters such as openings with one inch, twelve threads, and one and one-half inch, sixteen threads. These two threads are the most common and are generally incorporated in most readily available and inexpensive industrial and automotive type filters. The present invention provides the end user with greater latitude in selecting a filter for a new hydraulic installation or as a retro-fit to an old or existing reservoir of a hydraulic system.

U.S. Pat. No. 4,045,349 to Humbert discloses a filter having two different sized internally threaded openings for use with two different sized, externally threaded, attaching, structures, whereby a single filter element may be manufactured and stocked for desired use of any one of two different sized, externally threaded, attaching structures. While the concept disclosed in the patent to Humbert is somewhat similar to the present invention, it suffers from several disadvantages or deficiencies when compared to the present invention, most of which relate to economic factors. The principal disadvantage or deficiency relates to the fact that the filters of Humbert must be specially made, probably in limited quantities and at greater expense, since it would probably have to be special ordered and not be a standard filter that would be shelved by most automotive part supply houses, other outlets, and industrial filter manufacturers.

The adapter of the present invention provides a cost-effective means for the user to upgrade his reservoir air filtering hydraulic system with readily available filters from local suppliers.

SUMMARY OF THE INVENTION

In accordance with the present invention, an adapter is provided which enables a person to use different, selected, sizes of inexpensive, readily available, filters to ventilate the fluid reservoir of a hydraulic system.

The adapter of the present invention includes a body having an axial central opening therethrough. The body includes an enlarged, cylindrical, central section having first and second opposed surfaces; a first end section having an enlarged, externally, threaded portion extending from the first surface of the central section, a smaller, externally, threaded portion extending from the enlarged, externally, threaded portion, a first O-ring mounted on the enlarged, externally, threaded portion, and a second O-ring mounted on the smaller, externally, threaded portion; a reduced cylindrical section attached to the second surface of the enlarged, cylindrical, central section of the body and having a washer mounted thereon; and a male bayonet member fixed to the free end of the reduced cylindrical section for securing the adapter to the fluid reservoir. The adapter is cooperable with the internally threaded opening of a selected sized, readily available, filter through use of either the enlarged, externally, threaded, portion or the reduced, externally threaded, portion of the first end section of the adapter to secure the selected filter to the adapter. The adapter is cooperable with a female receptacle member secured either directly or indirectly to the fluid reservoir through the fingers of the male locking member of the adapter being in frictional engagement with elements of the female receptacle member.

In accordance with the present invention, a unique adapter is provided that allows conventional standard filters of various sizes to be mounted on a reservoir for hydraulic systems to permit filtered air to flow into and out of the reservoir as hydraulic fluid is pumped out into the hydraulic system and returned to the reservoir.

It is an object of the invention to provide an adapter designed to mate with a fitting on a hydraulic fluid reservoir and fittings of various sized conventional, standard, filters to provide greater air filtration for the hydraulic fluid reservoir.

It is a further object of the invention to provide an adapter designed to mate with a female receptacle secured to a hydraulic fluid reservoir and to a selected size of at least two sized threaded openings of standard, conventional, filters to provide greater air filtration for the hydraulic fluid reservoir.

It is yet a further object of the invention to provide an adapter having a male bayonet fitting secured to one of its ends for mating with a female receptacle attached to a hydraulic fluid reservoir and a multiple-stepped externally threaded sections at its other end for mating with multiple sized threaded openings of standard filters to provide greater air filtration for the hydraulic fluid reservoir, whereby a selected filter may be readily threadably secured to the adapter by engagement with the proper size externally threaded section of the adapter.

These objects as well as other objects of the present invention will become more readily apparent after reading the following description in conjunction with the accompanying drawings.

DETAILED DESCRIPTION OF THE INVENTION

Figure 1:
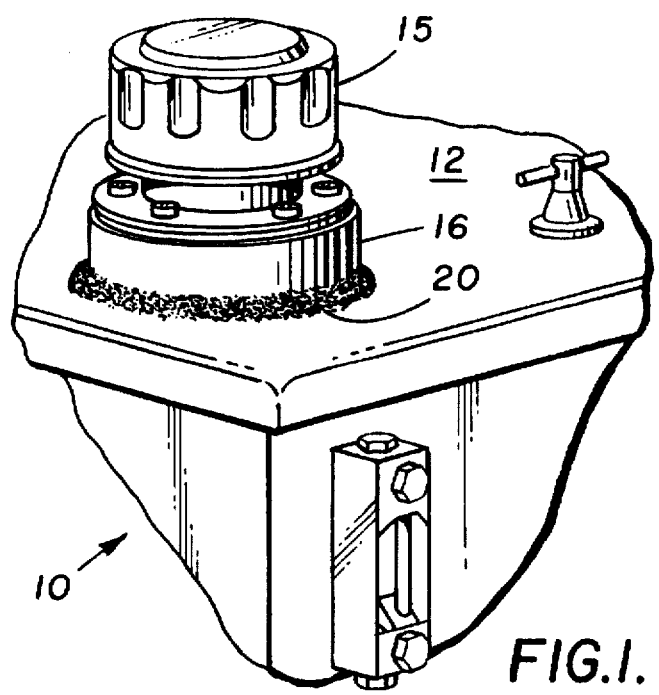
FIG. 1 is a perspective view of a hydraulic reservoir having a riser welded thereto with the adapter of the present invention mounted on the riser and a conventional bayonet style small filler breather filter secured thereto.
Figure 3:
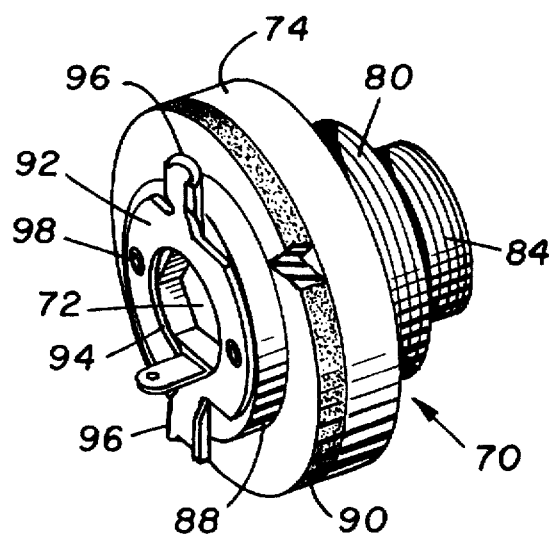
FIG. 3 is a perspective view of the adapter of the present invention showing the details thereof.
Figure 4:
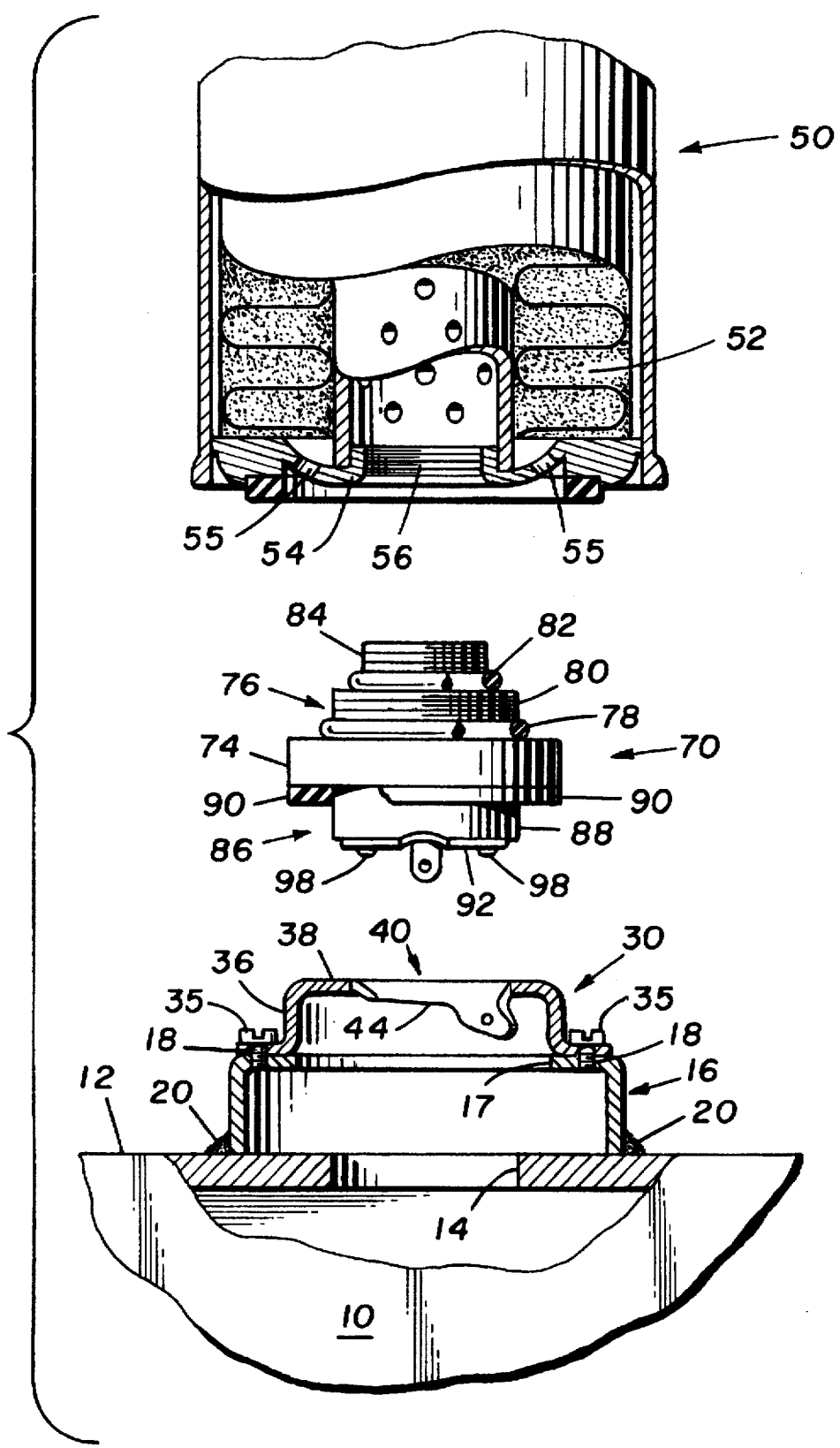
FIG. 4 is a greatly enlarged, fragmentary, exploded, partially sectional view, of the adapter of the present invention, a conventional oil or air filter having a first sized, small opening, a female receptacle member, a riser, and a hydraulic reservoir.
Figure 5:
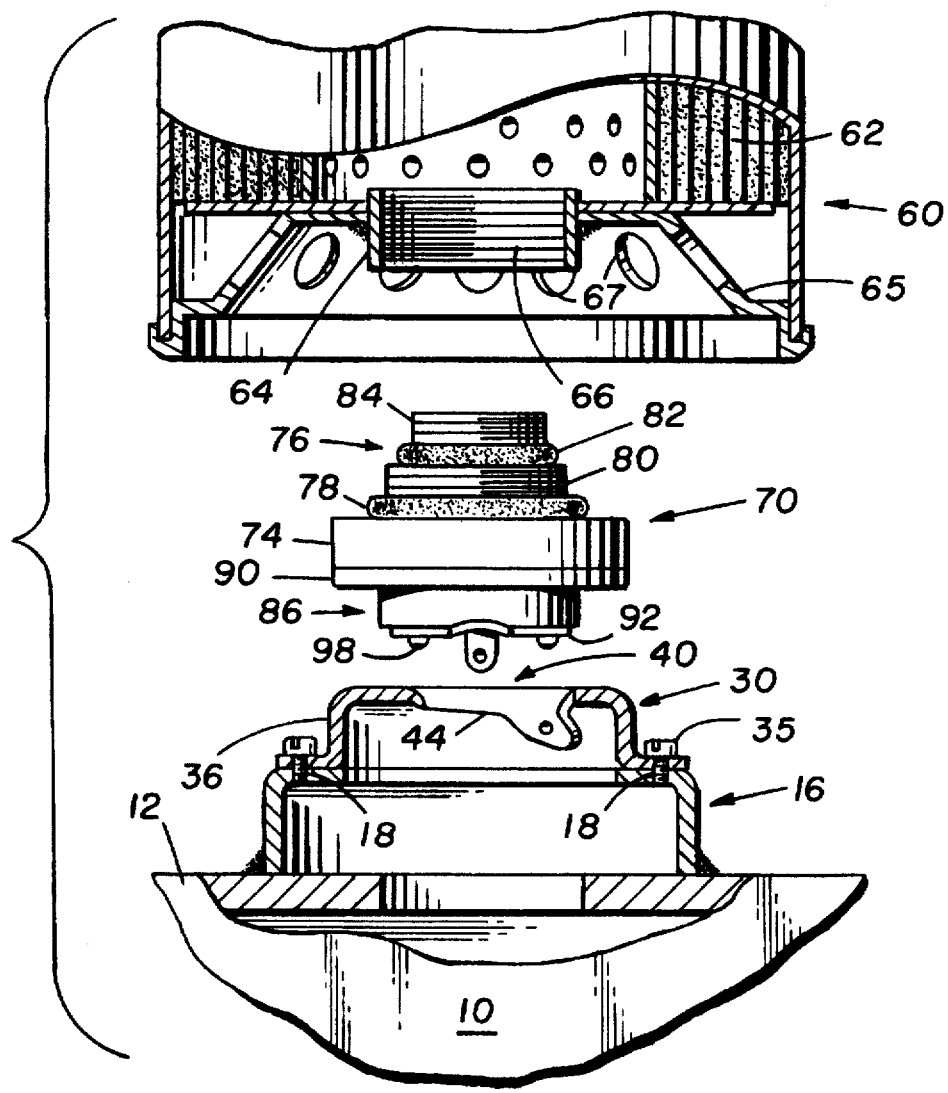
FIG. 5 is a greatly enlarged, fragmentary, exploded, view, of the adapter of the present invention, a conventional oil or air filter having a second sized, large opening, a female receptacle member, a riser, and a hydraulic reservoir.

Referring now to FIGS. 1, 4 and 5 of the drawings, reference numeral 10 generally designates a hydraulic reservoir used in association with internal combustion engines, electrically driven motors and many types of machinery. Reservoir 10 includes an internal cavity (not numbered) for housing hydraulic fluid (not shown), a gauge (not numbered) for indicating the fluid level within the reservoir, a top or cover 12 having an opening 14 in communication with the cavity, and an inverted cup-shaped riser 16 having an internal opening 17 therein secured to the top or cover 12 by a weld 20, and a plurality of spaced internally threaded holes 18. FIG. 1 shows a conventional bayonet style filler breather filter 15 secured to the reservoir 10 through use of the adapter of the present invention.

Figure 2:
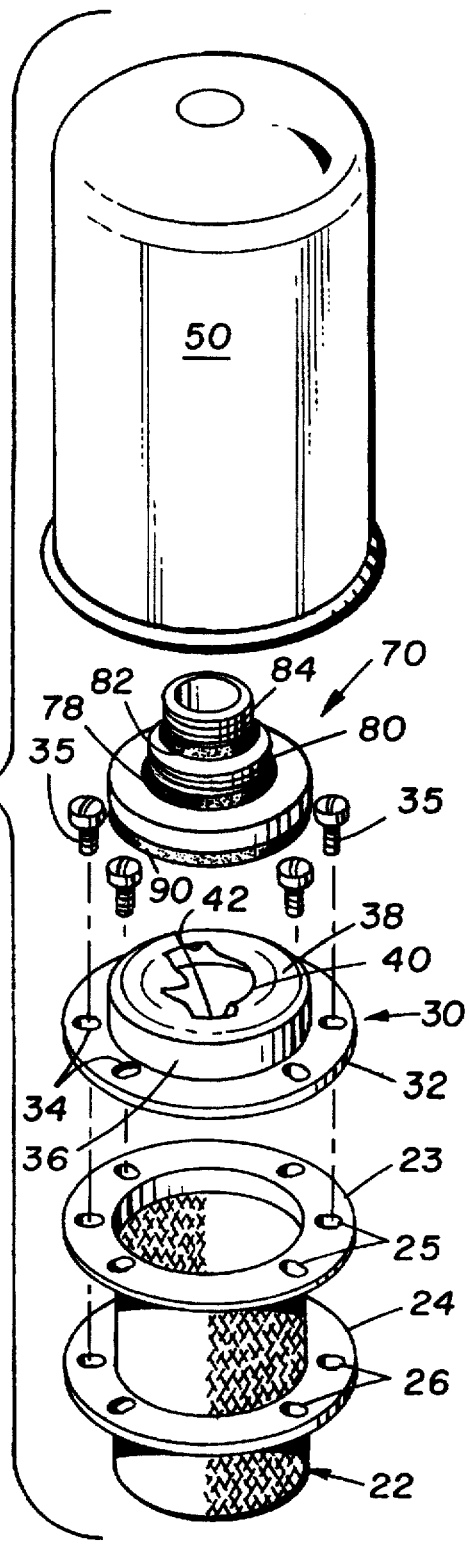
FIG. 2 is an exploded, perspective view showing the relationship of the adapter of the present invention with a conventional oil or air filter, a female receptacle member, a conventional basket screen, and a gasket.

As best seen in FIG. 2, reference numeral 22 designates a conventional screen having an upper flange 23 with a plurality of spaced holes 25 therein. Also as best seen in FIG. 2, reference numeral 24 designates a conventional gasket having a plurality of spaced holes 26 therein.

Figure 6:
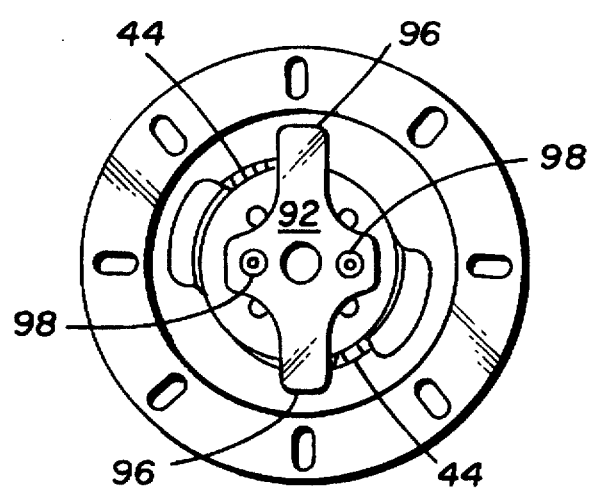
FIG. 6 is a bottom plan, partially in section, view showing the mating of the male locking fingers of the adapter of the present invention with the tapered tabs of the female receptacle member to lock the adapter to the female receptacle member.

As best seen in FIGS. 2 and 4-6, reference numeral 30 designates a female receptacle member having an annular flange 32 with a plurality of spaced holes 34 therein, a generally cylindrical portion 36 having an upper surface 38 provided with an opening 40 therein, and a pair of radially extending cutouts 42, each with a tapered tab 44 (FIG. 6).

As best seen in FIG. 4, reference numeral 50 designates a first standard oil or air filter that can be used in association with the adapter 70 of the present invention. The first standard filter 50 has a conventional filter media 52 therein and a nut member 54 having an internal threaded opening 56 and a plurality of spaced holes 55 for allowing air to enter and leave the interior of filter 50.

As best seen in FIG. 5, reference numeral 60 designates a second standard oil or air filter that can be used in association with the adapter 70 of the present invention. The second standard filter 60 includes an inner cavity (not numbered) having a conventional filter media 62 therein and a nut member 64 having an internally threaded opening 66. The nut member 64 is supported within the filter 60 by a generally inverted cup shaped structure 65 having a plurality of spaced holes 67 for allowing air to enter and leave the interior of filter 60.

As best seen in FIGS. 3-6, reference numeral 70 designates the adapter of the present invention that can be used in association with different sized conventional oil or air filters such as those designated by referenced numerals 15, 50 or 60. Adapter 70 includes an axial central opening 72 therethrough; an enlarged, cylindrical, central section 74; a first end section 76 (FIGS. 4 and 5) having an enlarged, externally, threaded portion 80, a reduced, externally, threaded, portion 84, a first O-ring 78 mounted adjacent the enlarged threaded portion 80, and a second O-ring 82 mounted adjacent the reduced threaded portion 84; a second end section 86 (FIGS. 4 and 5) having a reduced cylindrical portion 88, a rubber washer 90 mounted on reduced cylindrical portion 88, a male locking member 92 having a central opening 94, a pair of fingers 96, and a plurality of braids or screws 98 for securing the male locking member 92 to the face of reduced cylindrical portion 88 of adapter 70.

The screen 22, gasket 24 and female bayonet member 30 as shown in FIG. 2 are secured directly to the hydraulic fluid reservoir 10 by passing externally threaded screws 35 through respective holes 34 in flange 32 of female receptacle member 30, respective holes 25 in upper flange 23 of screen 22, and respective holes 26 in gasket 24 and into respective spaced internally threaded openings (not shown) in the top or cover 12 of hydraulic reservoir 10. If a riser 16 is secured to the top 12 of fluid reservoir 10 as shown in FIGS. 1, 4 and 5, the female receptacle member 30 is secured to the riser 16 by passing the externally threaded screws 35 through respective openings 34 in flange 32 of female receptacle member 30 and engaging respective threaded screws 35 with the internal threads of respective openings 18 in riser 16. As is apparent, riser 16 in not essential, but is provided solely to enable the use of some conventional, standard, oil filters on the market.

The conventional rubber gaskets as found on most, if not all, standard oil filters and perhaps some standard air filters and as shown in FIG. 4 serve no function whatsoever since the conventional oil or air filters function as air filters and do not form a seal to prevent leakage of fluid which might normally flow through the filter. As used herein, no fluid flows through the filter. Air only flows through the filter with the filter media within the filter trapping or catching any contaminants which might enter the filter.

In operation, with the female receptacle member 30 being mounted on the fluid reservoir 10, the user will select a standard filter such as those designated by reference numerals 50 or 60 and having an internally threaded opening of a predetermined size and tightly engage either the threaded reduced portion 84 or the threaded enlarged portion 80 of the adapter 70 with the internally threaded opening of the filter until the engagement is sealed by either O-ring 78 or 82 dependent upon the size of the internally threaded opening within the filter. The user will then insert the fingers 96 of male locking member 92 on the second end section 86 of adapter 70 through the radially extending cutouts 42 of female receptacle member 32 and rotate the filter and the adapter 70 so that each finger 96 of male locking member 92 rides upon a respective tapered tab 44 to tightly engage the adapter 70 to the female receptacle member 30.

As is readily apparent, through the use of adapter 70, a user can select almost any standard oil or air filter for connection to a hydraulic reservoir to provide greater air filtration for the hydraulic reservoir.

While the above description constitutes a preferred embodiment of the present invention, it will be appreciated that the invention is susceptible to modification, variation and change without departing from the proper scope and fair meaning of the accompanying claims. For example, it is readily apparent that the adapter of the present invention could have a single externally threaded portion or it could have in excess of two, stepped, externally threaded portions; perhaps in the order of three to five such stepped, externally threaded portions.

We claim:

1. An adapter for selectively coupling filters having different sized female threaded openings to a female type connector secured to a hydraulic fluid reservoir for a hydraulic system, said adapter comprising a body having an axial opening therethrough and a central section provided with a pair of opposing surfaces; a first externally threaded section extending axially away from the first of said opposing surfaces of said central section; at least a second externally threaded section extending away from said first externally threaded section; said first and second externally threaded sections being disposed in stepped relation; said first externally threaded section and said second externally threaded section having respective first and second diameters for selective threaded engagement with said female threaded openings of said filter; and securing means mounted on the second of said opposing surfaces for releasably secured relation of said adapter to said hydraulic fluid reservoir.

2. The adapter of claim 1 wherein at least one externally threaded section engages the female threaded opening of the filter.

3. The adapter of claim 1 wherein said securing means includes a male locking member for engagement with a female receptacle fixed to the hydraulic fluid reservoir.

4. The adapter of claim 3 wherein said male locking member includes a pair of fingers for passing through an opening in the female receptacle fixed to the hydraulic fluid reservoir and engaging tapered tabs of the female receptacle.

5. The adapter of claim 4 further including an O-ring mounted each on said externally threaded section.

6. An adapter for selectively coupling filters having different sized female threaded openings to a female receptacle member secured to a hydraulic fluid reservoir for a hydraulic system, said adapter comprising:

a body having an axial opening extending therethrough, said body having a central section provided with a pair of opposing surfaces; a first externally threaded section extending axially away from the first of said opposing surface, said first externally threaded section having a predetermined diameter; a second externally threaded section extending axially away from said first externally threaded section and having a diameter smaller than said predetermined diameter of said first externally threaded section; and securing means mounted on the second of said opposing surfaces for releasably secured relation of said adapter to said hydraulic fluid reservoir.

7. The adapter of claim 6 wherein a selected one of said first externally threaded section and said second externally threaded section engages the female threaded opening of the selected filter.

8. The adapter of claim 7 wherein said securing means includes a male locking member for engagement with a female receptacle fixed to the hydraulic fluid reservoir.

9. The adapter of claim 8 wherein said male locking member includes a pair of fingers for passing through an opening in the female receptacle fixed to the hydraulic fluid reservoir and engaging tapered tabs of the female receptacle.

10. The adapter of claim 9 further including an O-ring mounted on said first externally threaded section.

11. The adapter of claim 10 further including an O-ring mounted on said second externally threaded section.

12. An adapter for coupling filters having different sized female threaded openings to a female type bayonet fitting secured to a hydraulic fluid reservoir for a hydraulic system, said adapter comprising:

an enlarged cylindrical central section having an opening therethrough;

a first end section having an opening therethrough and including a primary portion having a diameter smaller than said enlarged central cylindrical central section and a secondary portion having a diameter smaller than both said enlarged cylindrical central section and said primary portion, said primary portion and said secondary portion having external threads thereon; and a second end section having an opening therethrough and of a diameter smaller that said enlarged central section, said second end section including a male locking member for mating engagement with the female type bayonet member secured to the hydraulic fluid reservoir.

13. The adapter of claim 12 wherein each of said primary and secondary portions of said first end section includes external threads thereon for mating with a selected female opening in the filters.

14. The adapter of claim 13 further including an O-ring mounted on each of said primary and secondary portions of said first end section.

15. In combination with a hydraulic fluid reservoir having a female type receptacle fitting secured thereto and of the type for providing hydraulic fluid to machinery and a standard filter having a filter media therein and a threaded opening of a predetermined size, the improvement comprising an adapter for connecting the standard filter to the hydraulic fluid reservoir, said adapter comprising:

an enlarged cylindrical central section having an opening therethrough;

a first end section having an opening therethrough and including a primary portion having a diameter smaller than said enlarged central cylindrical central section and a secondary portion having a diameter smaller than both said enlarged cylindrical central section and said primary portion, said primary portion and said secondary portion having external threads thereon; and a second end section having an opening therethrough and of a diameter smaller that said enlarged central section, said second end section including a male locking member for mating engagement with the female type receptacle fitting secured to the hydraulic fluid reservoir.

16. The combination of claim 15 wherein each of said primary and secondary portions of said first end section of said adapter includes external threads thereon for mating with the female opening in the filter of a predetermined size.

17. The combination of claim 16 wherein said adapter further includes an O-ring mounted on each of said primary and secondary portions of said first end section of said adapter.

* * * * *